United States Patent
Bandel et al.

(10) Patent No.: US 8,228,323 B2
(45) Date of Patent: Jul. 24, 2012

(54) ELECTRONIC DOCUMENT READER SYSTEM

(75) Inventors: Carano Bandel, Cambridge (GB); Hermann Hauser, Cambridge (GB); Carl Hayton, Cambridge (GB); Simon Jones, Cambridge (GB); John Mills, Cambridge (GB); Henning Sirringhaus, Coton (GB)

(73) Assignee: Plastic Logic Limited, Cambridge, Cambridgeshire (GB)

( * ) Notice: Subject to any disclaimer, the term of this patent is extended or adjusted under 35 U.S.C. 154(b) by 938 days.

(21) Appl. No.: 12/139,011

(22) Filed: Jun. 13, 2008

(65) Prior Publication Data
US 2009/0219271 A1    Sep. 3, 2009

(30) Foreign Application Priority Data
Mar. 3, 2008 (GB) .................... 0803915.8

(51) Int. Cl.
*G09G 5/00* (2006.01)
(52) U.S. Cl. ...................................... 345/211
(58) Field of Classification Search .......... 345/156–175, 345/81, 82, 206, 169
See application file for complete search history.

(56) References Cited

U.S. PATENT DOCUMENTS

| | | | |
|---|---|---|---|
| 4,453,200 A | 6/1984 | Treka et al. | |
| 4,856,088 A | 8/1989 | Oliwa et al. | |
| 5,347,630 A | 9/1994 | Ishizawa et al. | |
| 5,508,720 A * | 4/1996 | DiSanto et al. | 345/169 |
| 5,857,157 A | 1/1999 | Shindo | |
| 5,956,034 A | 9/1999 | Sachs et al. | |
| 6,297,945 B1 | 10/2001 | Yamamoto | |
| 6,388,877 B1 | 5/2002 | Canova, Jr. et al. | |
| 6,456,732 B1 | 9/2002 | Kimbell et al. | |
| 6,661,920 B1 | 12/2003 | Skinner | |
| 6,831,662 B1 | 12/2004 | Lum et al. | |
| 6,888,643 B1 | 5/2005 | Grimes | |
| 6,919,879 B2 | 7/2005 | Griffin et al. | |
| 6,961,029 B1 | 11/2005 | Canova, Jr. et al. | |
| 7,058,829 B2 | 6/2006 | Hamilton | |

(Continued)

FOREIGN PATENT DOCUMENTS
EP    0 283 235    5/1987
(Continued)

OTHER PUBLICATIONS www.palm.com, Palm Z22, T/X, and Tungsten E2 handhelds (copyright 2005).

(Continued)

*Primary Examiner* — Nitin Patel
*Assistant Examiner* — Carolyn R Edwards
(74) *Attorney, Agent, or Firm* — Fish & Richardson P.C.

(57) ABSTRACT

We describe an electronic document reader system for viewing electronic documents, in which the electronic documents are viewable on a removable electronic document reader display that is useable whilst removed from an electronic document reader display holder. The system comprises: a removable non-volatile display for viewing electronic documents thereon, the display having a display portion on which electronic documents are viewable; a display holder for receiving the removable display, the display holder comprising a back, and an open front shaped to receive the removable display, each of the display and the holder having an electrical interface, wherein, when the removable display is received in the open front, the removable display and holder form an electrically connected combined unit to enable the display to receive document data from the holder for display, and wherein the removable display is useable to read electronic documents when removed from the display holder.

26 Claims, 7 Drawing Sheets

U.S. PATENT DOCUMENTS

| | | | |
|---|---|---|---|
| 7,079,111 | B2 | 7/2006 | Ho |
| 7,289,084 | B2 | 10/2007 | Lesniak |
| 2002/0018027 | A1 | 2/2002 | Sugimoto |
| 2002/0102866 | A1 | 8/2002 | Lubowicki |
| 2003/0090480 | A1* | 5/2003 | Polgar et al. ............ 345/206 |
| 2004/0008398 | A1 | 1/2004 | Amundson |
| 2004/0246666 | A1 | 12/2004 | Maskatia et al. |
| 2004/0268004 | A1 | 12/2004 | Oakley |
| 2005/0025387 | A1 | 2/2005 | Luo |
| 2005/0206580 | A1 | 9/2005 | Koyama et al. |
| 2005/0237444 | A1 | 10/2005 | You |
| 2005/0257143 | A1 | 11/2005 | Lewis |
| 2006/0026536 | A1 | 2/2006 | Hotelling et al. |
| 2006/0274549 | A1 | 12/2006 | Fukuyoshi |
| 2007/0024603 | A1 | 2/2007 | Li |
| 2007/0028086 | A1 | 2/2007 | Oshima et al. |
| 2007/0058178 | A1 | 3/2007 | Kurihara et al. |
| 2007/0115258 | A1 | 5/2007 | Cupps et al. |
| 2007/0195009 | A1 | 8/2007 | Yamamoto et al. |
| 2007/0213105 | A1 | 9/2007 | Huber et al. |
| 2008/0297470 | A1 | 12/2008 | Marsh et al. |
| 2008/0297496 | A1 | 12/2008 | Watson et al. |
| 2008/0298083 | A1 | 12/2008 | Watson et al. |
| 2009/0109185 | A1 | 4/2009 | Barclay et al. |
| 2009/0109468 | A1 | 4/2009 | Barclay et al. |
| 2009/0109498 | A1 | 4/2009 | Barclay et al. |
| 2009/0113291 | A1 | 4/2009 | Barclay et al. |
| 2009/0219271 | A1 | 9/2009 | Bandel et al. |

FOREIGN PATENT DOCUMENTS

| | | |
|---|---|---|
| EP | 1308825 | 5/2003 |
| EP | 1308825 | 7/2003 |
| EP | 1355221 | 10/2003 |
| GB | 2 214 342 | 8/1989 |
| GB | 2 446 499 | 8/2008 |
| GB | 2 446 500 | 8/2008 |
| GB | 2 454 032 | 4/2009 |
| GB | 2 454 033 | 4/2009 |
| JP | 10-027162 | 1/1998 |
| JP | 2005266968 | 9/2005 |
| JP | 2005274832 | 10/2005 |
| WO | 95/23367 | 8/1995 |
| WO | 02/095555 | 11/2002 |
| WO | 03/017245 | 2/2003 |
| WO | 03/044765 | 5/2003 |
| WO | 2004/114259 | 12/2004 |
| WO | 2006/031347 | 3/2006 |
| WO | 2009/053738 | 4/2009 |
| WO | 2009/053740 | 4/2009 |
| WO | 2009/053743 | 4/2009 |
| WO | 2009/053747 | 4/2009 |

OTHER PUBLICATIONS

Search Report and Examiner Letter for Application No. GB0802011.7 (dated Aug. 27, 2009).
Search Report; GB 0803915.8; D. Maskery; Jun. 17, 2008.
www.palm.com; Palm Z22,Tl and Tungsten E2 handhelds.
International Search Report; GB0801998.6; D. Maskery; May 28, 2008.
Search Report; GB 0802011.7; R. Jenkins; Jun. 18, 2008.
Iddo Genuth: "the Future of Electronic Paper" [Online]; Oct. 15, 2007, XP002513292; http://thefutureofthings.com/articles/1000/the-future-of-electronic-paper.html.
International Search Report; PCT/GB2008/050980; Feb. 23, 2009; E. Maciu.
International Search Report; GB 0802816.9; J. McCann; May 23, 2008.
International Search Report; PCT/GB2008/050977; Feb. 19, 2009; E. Maciu.
International Search Report; GB 0802818.5; J. McCann; May 29, 2008.
Search Report; GB0802820.1; R. Jenkins; Sep. 12, 2008.
International Search Report; PCT/GB2008/050975; Feb. 20, 2009; E. Maciu.
USPTO Office Action in U.S. Appl. No. 12/027,176, mailed Jun. 4, 2009, 12 pages.
Search Report; GB 0801987.9; D. Maskery; May 19, 2008.

* cited by examiner

ELECTRONIC DOCUMENT READER SYSTEM

FIELD OF THE INVENTION

The present invention relates to electronic document reader systems in which electronic documents are viewable on an electronic document reader display. In particular, the present invention relates to a document reader system in which the electronic documents are viewable on a removable electronic document reader display that is useable whilst removed from an electronic document reader display holder.

BACKGROUND OF THE INVENTION

We have previously described a form of electronic document reading devices in our earlier applications PCT/GB2006/050235 and GB 0801987.9, hereby incorporated by reference.

Background prior art relating to electronic document reading devices can be found in U.S. Pat. No. 6,124,851, US2004/0201633, US2006/0133664, US2006/0125802, US2006/0139308, US2006/0077190, US2005/0260551, U.S. Pat. No. 6,021,306, US2005/0151742, and US2006/0119615. Prior art relating to displays can be found in EP0,283,235, GB2, 214,342, and U.S. Pat. No. 6,831,662.

There is, however, a desire for improved electronic reading devices.

SUMMARY OF THE INVENTION

The present invention provides an electronic document reader system for viewing electronic documents, comprising: a removable non-volatile display for viewing electronic documents thereon, the display having a display portion on which electronic documents are viewable; a display holder for receiving the removable display, the display holder comprising a back, and an open front shaped to receive the removable display, each of the display and the holder having an electrical interface, wherein, when the removable display is received in the open front, the removable display and holder form an electrically connected combined unit to enable the display to receive document data from the holder for display, and wherein the removable display is useable to read electronic documents when removed from the display holder.

Advantageously, the display and holder may be connected together so that data and/or power may be supplied to the removable display, which may then be useable to view electronic documents when removed from the holder. The invention therefore provides an electronic document reader that is either light-weight and very portable (that is, when removed from the holder), or has increased functionality (that is, when connected to the holder). In preferred embodiments, the display and holder are both portable, and battery powered.

In preferred embodiments, the display holder comprises retaining means to releasably retain the received removable display flush in the display holder so as to give the removable display and display holder a generally laminar shape. Preferably, the retaining means further comprises one or more protrusions along a first inside edge of the open front of the display holder and one or more spring-loaded protrusions along a second inside edge of the open front of the display holder opposing the first inside edge, the protrusions being shaped so as to engage with a correspondingly shaped recess in respective edges of the removable display. Preferably, the display holder further comprises a display releasing means to release the removable display from the display holder, the display releasing means comprising a flap on the one or more spring-loaded protrusions positioned in a base of the open front so as to sit under the removable display when the display is received in the holder, and the flaps being operable to push the removable display from the display holder.

In embodiments, the display holder protects and/or mechanically supports the removable display when the removable display is received in the open front. The display and holder may therefore be carried around and used away from the normal working environment.

In embodiments, the display holder substantially matches the removable display so as to give the appearance that the display holder is an extension of the removable display when the display is received in the open front.

Preferably, when the removable display is received in the open front of the display holder, the display is connected to the display holder to receive power.

In embodiments, the removable display is receivable in the display holder in a forward position in which the removable display is readable by a user when the display is received in the display holder. Additionally or alternatively, the open front of the display holder has a bottom surface and wherein the removable display is receivable in the display holder in a storage position in which the display portion of the removable display faces towards the bottom surface so as to protect the display portion.

In embodiments, the display holder comprises an electrical connector along a portion of an inside edge of the open front, the electrical connector comprising a row of electrical contacts shaped and positioned along the inside edge so as to contact a correspondingly shaped and positioned electrical connector in an edge of the removable display when the display is received in the display holder.

In embodiments, the display holder further comprises an external electrical connector for connection to one or more of external peripherals and/or external power sources. Preferably, the display holder further comprises a wireless interface to transmit data to and/or receive data from external peripherals. Preferably, the wireless interface comprises one or more of Bluetooth, 3G and Wifi.

In embodiments, the external peripherals, when connected to the display holder, are accessible by the removable display when the display is in connection with the display holder.

In embodiments, the display holder contains a CPU, memory storage and application software that generates documents for display on the removable display.

Preferably, each of the removable display and display holder have a separate rechargeable power source. Preferably, the rechargeable power source of the display holder provides power to the display and/or recharges the rechargeable power source of the removable display when the display is received within the display holder.

In embodiments, the display portion of the removable display comprises an electroactive display. Preferably, the electroactive display comprises an electrophoretic display. In embodiments, the removable display comprises one or more touch sensitive regions in one or more regions of the display portion.

In embodiments, the removable display comprises a wireless interface for transmitting data to and/or receiving data from the display holder and/or one or more external peripherals. Preferably, the wireless interface comprises Bluetooth.

In embodiments, the display comprises an electrical connector along an edge of the display, the connector comprising a row of contacts shaped and positioned so as to contact a correspondingly shaped and positioned electrical connector on an inside edge of the open face of the display holder when the display is received in the display holder.

In embodiments, the removable display comprises a recess along one or more edges of the display for receiving a correspondingly shaped protrusion of the display holder for retaining the display in the display holder.

Preferably, the system has a thickness of less than 10 mm.

The present invention also provides a method of providing a portable electronic document, the method comprising: using a removable electroactive non-volatile display for displaying electronic documents in an electronic document reader system, the display comprising a memory store for storing electronic documents; writing one or more electronic documents to the memory store of the display; removing the removable display from the electronic document reader system; and using the removable display to display the electronic documents remote from the electronic document reader system.

The above method provides a means to view documents remote from the normal working environment.

The present invention further provides an electronic document reader system for viewing electronic documents, comprising: a removable non-volatile display for viewing electronic documents thereon, the display having a display portion on which electronic documents are viewable; a display holder for receiving the removable display, the display holder comprising a back, and an open front shaped to receive the removable display; wherein, when the removable display is received in the open front, the removable display and holder form a flush, combined unit so as to give the removable display and display holder a generally laminar shape, and wherein the removable display is useable to read electronic documents when removed from the display holder.

The present invention also provides an electronic document reader system for viewing electronic documents, comprising: a removable non-volatile display for viewing electronic documents thereon, the display having a display portion on which electronic documents are viewable; a display holder for receiving the removable display, the display holder comprising a back, and an open front shaped to receive the removable display; wherein, when the removable display is received in the open front, the display holder protects and/or mechanically supports the removable display, and wherein the removable display is useable to read electronic documents when removed from the display holder.

The present invention further provides an electronic document reader system for viewing electronic documents, comprising: a removable non-volatile display for viewing electronic documents thereon, the display having a display portion on which electronic documents are viewable; a display holder for receiving the removable display, the display holder comprising a back, and an open front shaped to receive the removable display; wherein the display holder substantially matches the removable display so as to give the appearance that the display holder is an extension of the removable display when the display is received in the open front, and wherein the removable display is useable to read electronic documents when removed from the display holder.

The present invention also provides an electronic document reader system for viewing electronic documents, comprising: a removable non-volatile display for viewing electronic documents thereon, the display having a display portion on which electronic documents are viewable; a display holder for receiving the removable display, the display holder containing a CPU, memory storage and application software, and the display holder comprising a back, and an open front shaped to receive the removable display, each of the display and the holder having an electrical interface, wherein, when the removable display is received in the open front, the removable display and holder form an electrically connected combined unit to enable the display to receive document data from the holder for display, wherein the application software generates documents for display on the removable display, and wherein the removable display is useable to read electronic documents when removed from the display holder.

In embodiments of each of the above-described aspects of the invention the holder may be configured as a holder or briefcase, providing both mechanical protection and functioning as an expansion unit for expanding the capabilities of the display.

BRIEF DESCRIPTION OF DRAWINGS

These and other aspects of the invention will now be further described by way of example only, with reference to the accompanying figures in which.

DETAILED DESCRIPTION OF THE PREFERRED EMBODIMENTS

Broadly speaking, we describe an electronic document reader system that has a display holder and a removable display. The display and holder may be connected together so that data and/or power may be supplied to the removable display, which is then useable to view electronic documents when removed from the holder.

Figure 1:
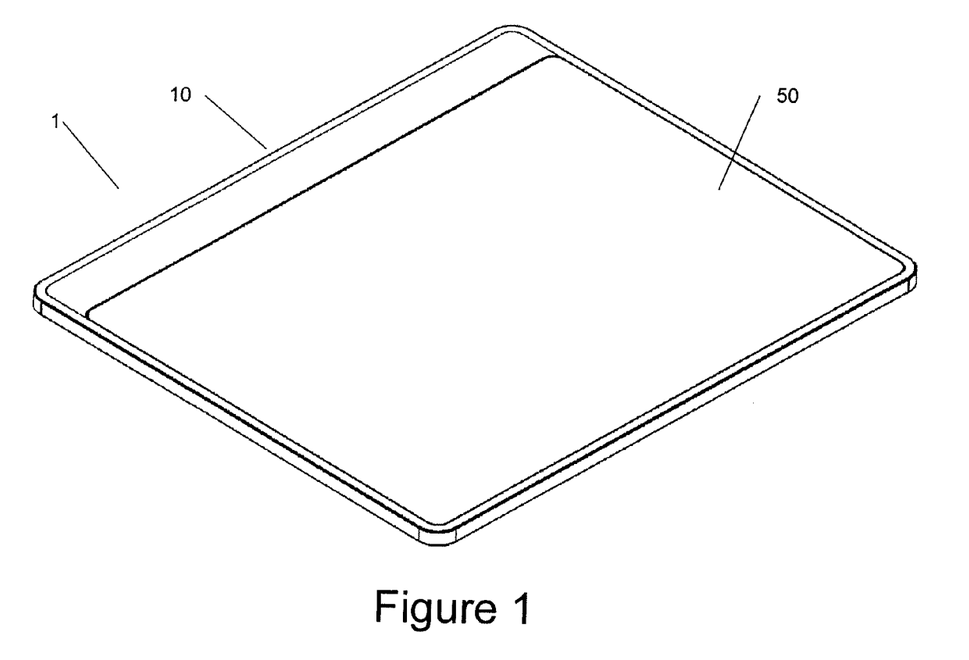
FIG. 1 shows an electronic document reader system.
Figure 2A:
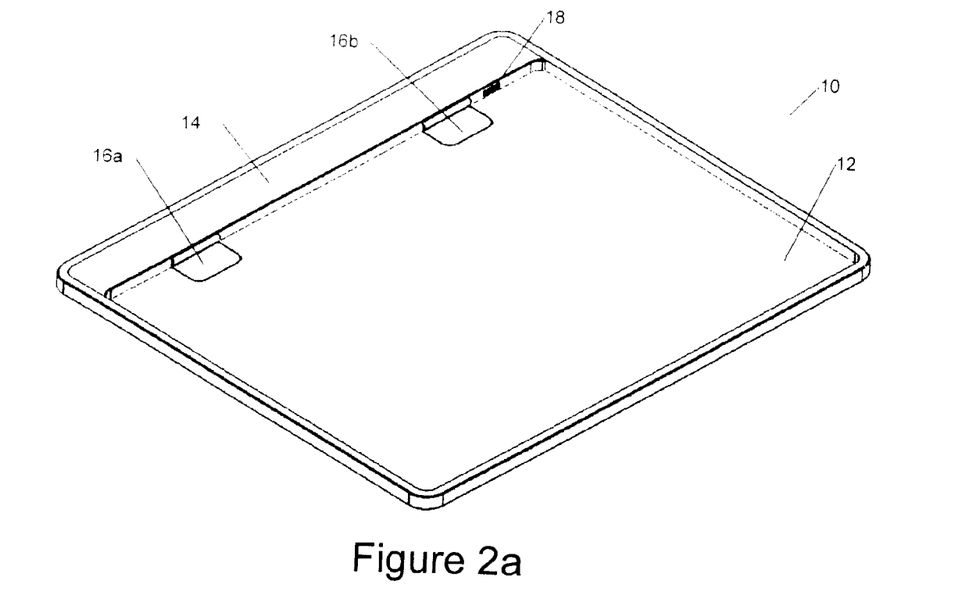
FIGS. 2a and 2b show a display holder of an electronic document reader system.
Figure 2B:
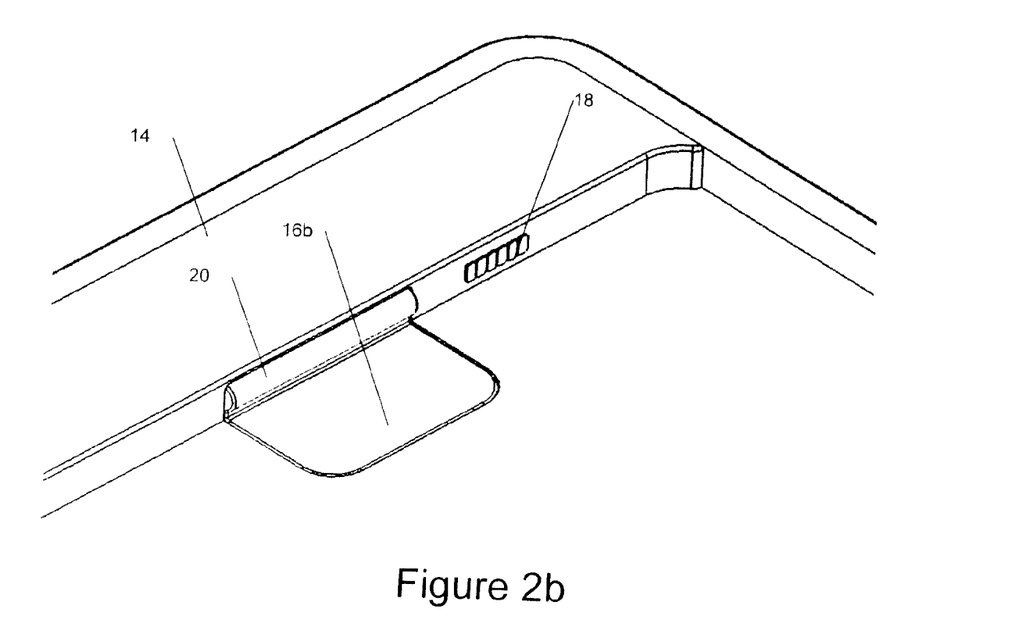
Figure 3:
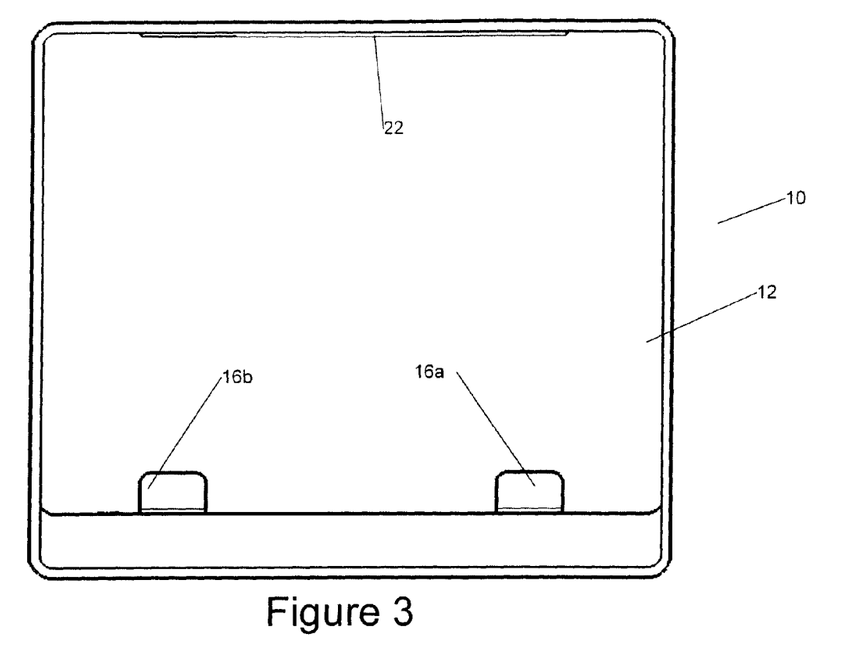
FIG. 3 shows an above view of the display holder of FIG. 2.
Figure 4:
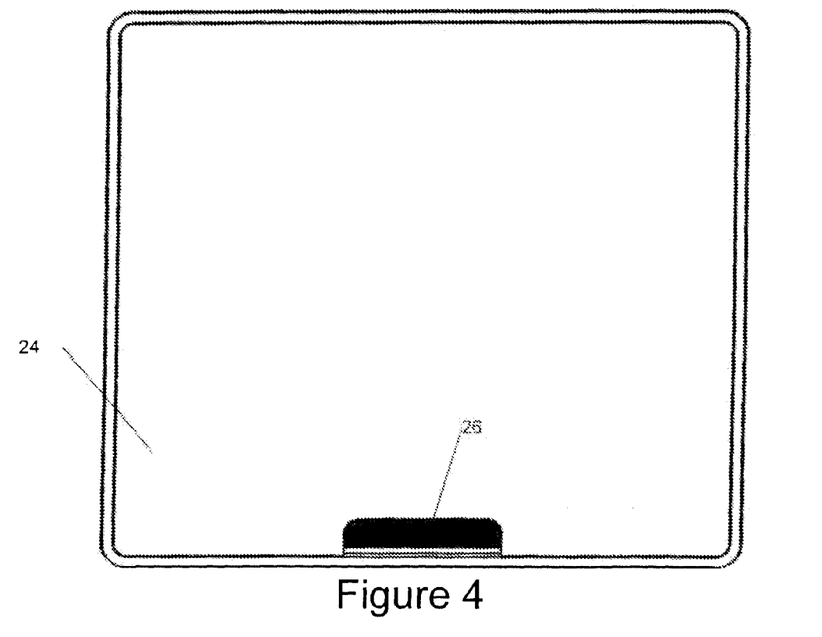
FIG. 4 shows a below view of the display holder of FIG. 2.
Figure 5A:
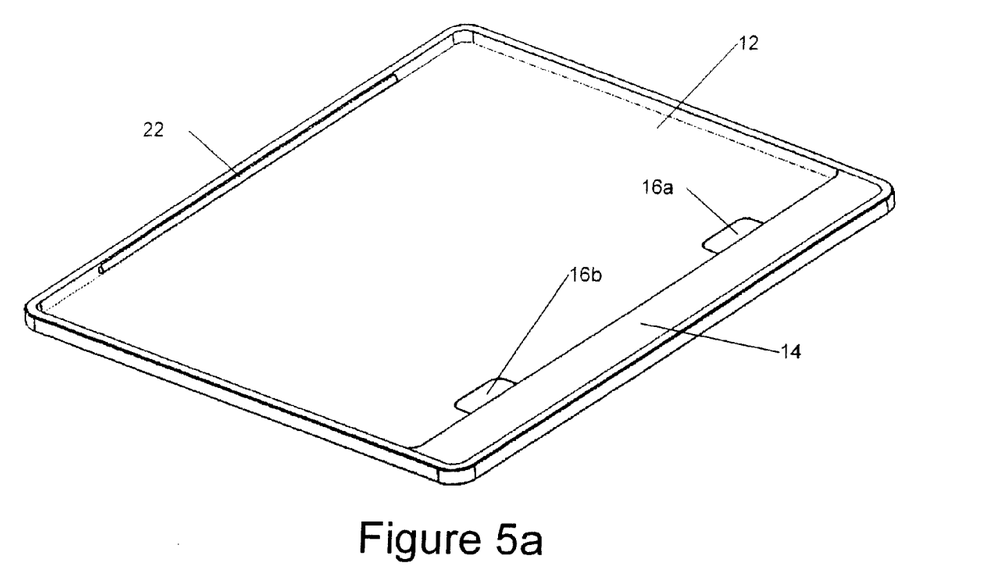
FIGS. 5a and 5b show the display holder of FIG. 1 from an alternative angle.
Figure 5B:
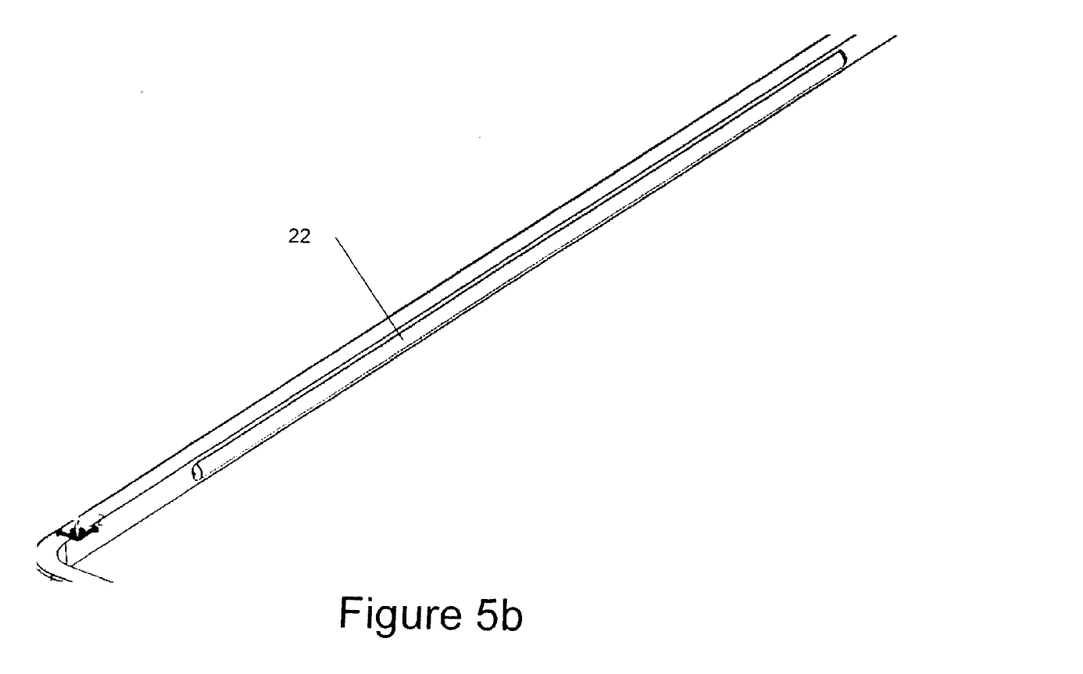

FIG. 1 shows an electronic document reader system 1, which comprises a display holder 10 that receives a removable display 50. Electronic documents are viewable on the removable display by a user. In the reader system, the holder 10 performs one or more functions, including: mechanically supporting and/or protecting the removable display whilst the display is received in the holder; providing additional connectivity to the removable display; providing power and/or electronic document data to the display; and providing additional electronic functions and/or processing power to the display. Each of these functions will be described below.

FIGS. 2 to 5 show the display holder 10 of the electronic document reader system. The display holder 10 has an open front 12, a back 24 and an edge portion 14. The open front 12 is shaped to receive the removable display 50. Various electronics and power supply are housed in the edge portion 14, and will be described in more detail below. Additionally, the display holder 10 has an electrical interface 18 to allow an electrical connection to the removable display 50. The holder also has retaining means 20 and 22 to retain the removable display in position, and one or more releasing flaps 16a, 16b to allow the removable display 50 to be removed from the holder 10.

The retaining means 22 comprises a protrusion along an inside edge of the open front 12. Here, the protrusion is shown as a roughly convex shape. Of course, other shapes may be used instead. The protrusion 22 is shaped to fit a correspondingly shaped recess in a corresponding edge of the removable display (which will be described later) so as to prevent the retained display edge from lifting from the holder. Additionally, the retaining means comprises protrusions 20 on the inside edge of the open front 12 opposing the inside edge having the protrusion 22. Again, the protrusion 20 (here shown as a roughly convex shape) is shaped to fit a correspondingly shaped recess a corresponding edge of the removable display so as to prevent the retained display edge from lifting from the holder.

One or both of the protrusion 20 and 22 may be spring-loaded to facilitate insertion of the removable display into the open front 12 of the holder 10. The spring-loaded protrusion(s) are biased in a protruding position (as shown) and, during insertion of the removable display, the spring-loaded protrusion(s) are pushed into the respective inside edge so as to allow the display to be inserted. Once the display is inserted, the spring-loaded protrusion(s) extend into the protruding position (and thus engaging with the correspondingly shaped recess in the corresponding edge of the display) and retain the removable display until released.

The releasing flaps 16a, 16b lie flush with the surface of the open front 12, extending away from the inside edge. Thus, the flaps 16a, 16b sit underneath the display when the display is received and held in the holder. A releasing panel or button 26 is linked to the flaps 16a, 16b so that pressure applied to the button 26 causes the ends of the flaps to lift by pivoting about an axis along the inside edge of the open front. The lifting flaps, when operated, thus apply an upward force to the display received in the holder. The upward force is sufficient to overcome the spring-loaded protrusions 20, 22, so releasing the display from the holder.

Whilst two flaps are shown in the drawings, the skilled reader would of course appreciate that one or more flaps would be capable of performing this function.

In an embodiment of the holder, the protrusion 20 forms part of the flap 16b (flap 16a also having a corresponding protrusion). Thus, the pivoting, lifting action further causes the protrusion to retract, aiding the release of the display from the holder.

The holder 10 is designed to have a substantially similar appearance to that of the removable display 50, and to have physical dimensions that are not substantially larger than the display 50. Typical dimensions of the display are 216 mm×279 mm×6 mm and typical dimensions of the holder are 251 mm×289 mm×7.5 mm. As discussed above, the open front 12 of the holder is shaped to receive the display 50.

When the display is received in the holder, the upper surface of the display sits flush with the upper surface of the holder, to give the reader system the appearance of single, combined unit having a generally laminar shape. Since the holder and display have substantially similar appearances, the holder appears to the user as an extension of the display. Also in this position the display portion lies within the holder such that the back of the display portion (now towards the front) is substantially flush with the surrounding part of the holder.

The display 50 can be received within the open front 12 of the holder 10 in a forward position or a storage position. In both forward and storage positions, the holder 10 protects and/or mechanically supports the display 50. In the forward position, a display portion of the display (which shall be described in detail below) faces towards the user so that the display is useable to view electronic documents whilst retained in the holder. In the storage position, the display portion of the display faces towards the bottom surface of the open front 12. In such a position, the display portion is protected from external damage.

The holder 10 comprises one or more external connectors (not shown) to enable the holder to receive power from an external power source and to communicate with a computer and external peripherals such us a mouse, keyboard, monitors and other such peripherals. The skilled person would understand that this is not an exhaustive list. Other peripherals and devices could be connected to the holder.

Wired external connectors to provide communication between the holder and external computers and/or peripherals include connectors such as USB and the like. Alternatively, or additionally, external computers and/or peripherals may be coupled to the holder wirelessly using wireless protocols such as Bluetooth™, WiFi, HSDPA (High Speed Downlink Packet Access), 3G, and other like protocols. Through such wired and/or wireless connectors, data may be transferred to and from the holder.

The holder 10 also comprises an internal electrical connector 18, which is disposed on an inside edge of the open front 12 of the holder 10. The internal connector 18 comprises a row of electrical contacts, typically 6 to 8, that are shaped and positioned along the inside edge of the open front 12 so as to contact a correspondingly shaped and positioned electrical connector located in an edge of the removable display (which will be described in detail later) when the display is received in the holder. The two sets of electrical contacts thereby provide a wired connection between the display 50 and the holder 10. As will be described later, the display 50 in fact comprises two sets of connectors so that a connection between the holder and display may be maintained when the display is in either of the forward and storage positions.

Through this internal connector 18, data may pass in either direction between the holder and display, and the holder may provide power to the display.

Alternatively, or additionally, the holder 10 may communicate with the display 50 through wireless protocols such as Bluetooth™ and the like. As such, the display may actually communicate with the holder without being retained in the holder. However, it is preferable that the wireless protocol(s) used for communication between the holder and display are power efficient protocols to prolong the battery life of the display and/or holder.

Figure 6A:
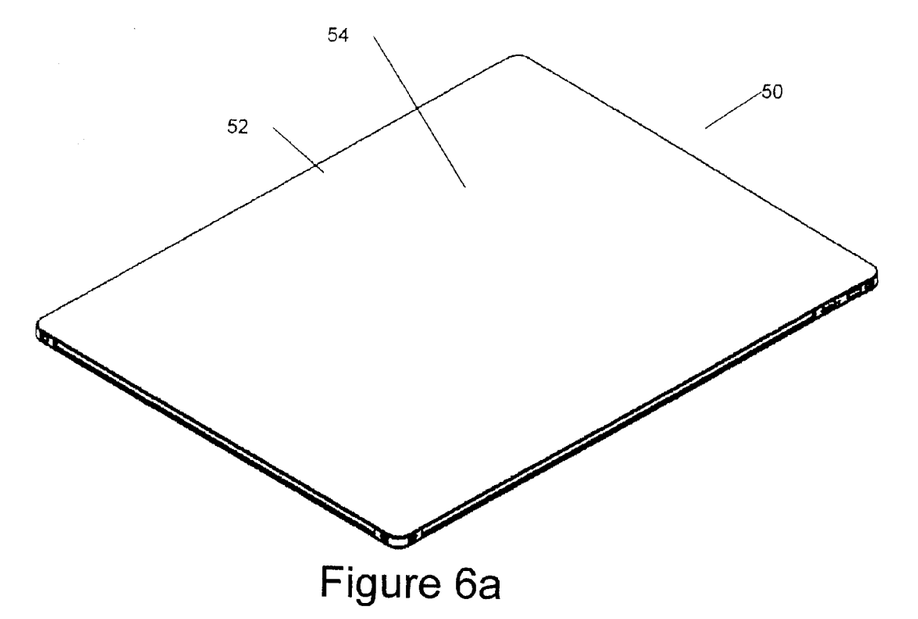
FIGS. 6a, 6b and 6c show a removable display of an electronic document reader system.
Figure 6B:
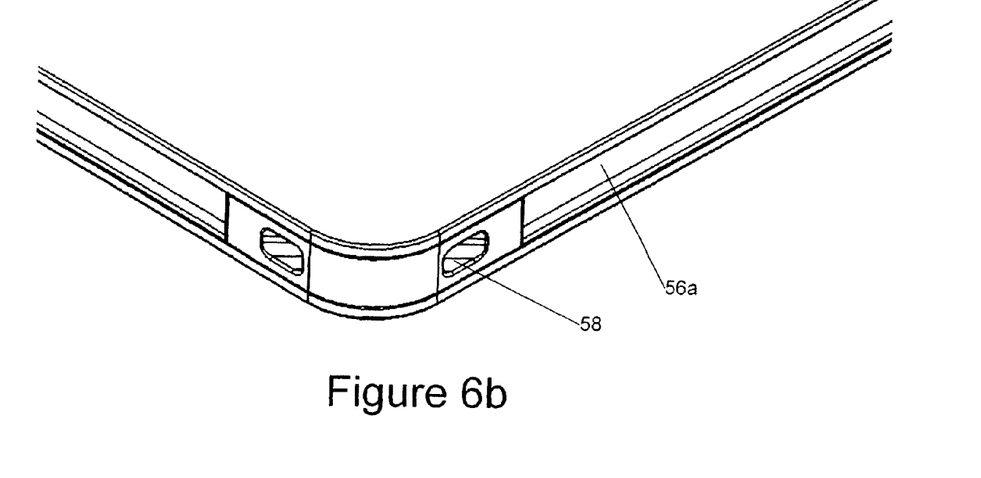
Figure 6C:
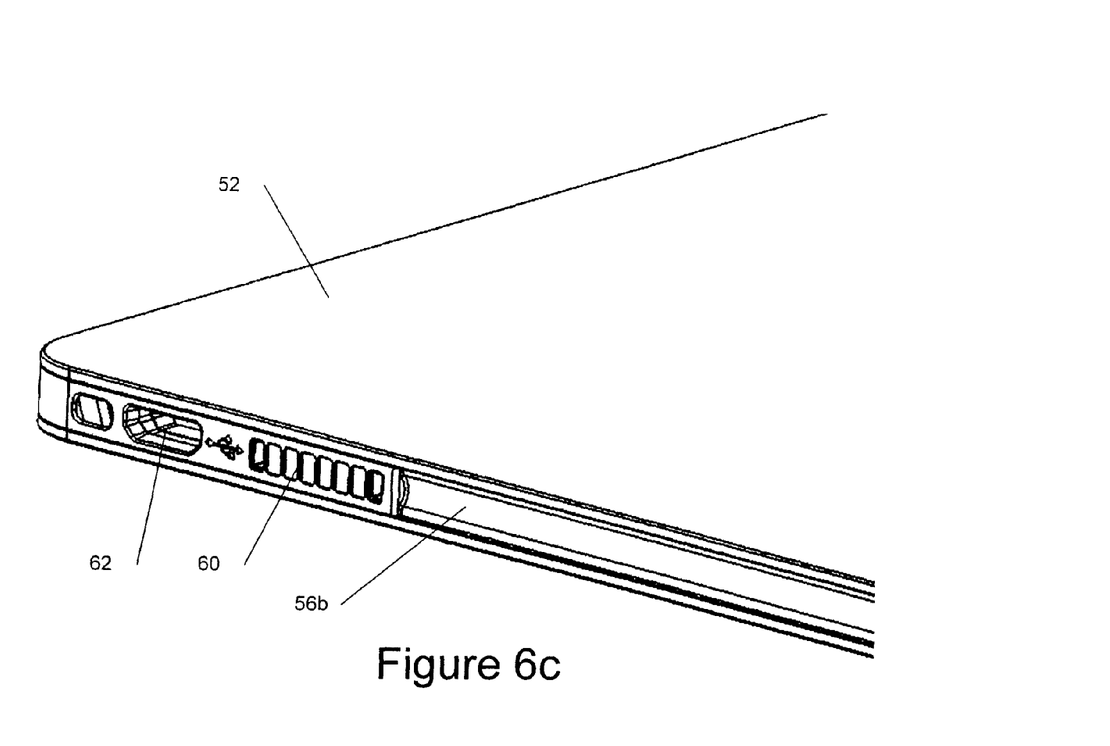

FIGS. 6a, 6b and 6c show a removable display 50 of an electronic document reader system 1. The display 50 has a front display surface 52, which comprises a re-writeable display portion 54 and non-re-writeable portion bordering the re-writable display portion. Electronic documents are viewable on the re-writable display portion 54. In preferred embodiments, the front display surface 52 is substantially flat to the edges of the removable display and, in particular, lacks a display bezel. As discussed, typical dimensions of the display are 216 mm×279 mm×6 mm.

In preferred embodiments, the re-writeable display portion 54 is an electroactive display device such as a reflective bistable display. Examples of such displays include electrophoretic, LDC or other like displays. In preferred embodiments, the display is an electrophortetic display.

The re-writable portion 54 of the display 50, comprises a number of layers. From the upper-most surface, the re-writeable display portion 54 comprises a substantially transparent front panel, for example made of perspex, a moisture barrier, a layer of electrophoretic display, an active matrix pixel driver circuitry layer, a substrate and a further moisture layer. The active matrix may comprise an array of organic or inorganic thin film transistors as disclosed, for example, in WO01/47045.

The substrate is typically of plastic such as PET (polyethylene terephthalate). The electrophoretic display is attached to the active matrix pixel driver circuitry layer by adhesive. The uppermost moisture barriers is, for example, of polyethylene and/or Aclar™, a fluoropolymer (polychlorotrifluoroethylene-PCTFE). The lower-most moisture barrier, under the substrate, does not need to be transparent. Therefore the lower-most moisture barrier may incorporate a metallic moisture barrier such as a layer of aluminium foil. This allows the lower-most moisture barrier to be thinner, hence enhancing overall flexibility. Approximate example thicknesses for the layers are as follows: 100 µm for moisture barrier 110, 200 µm for substrate 108, 5-6 µm for active layer 106, 190 µm for electroactive display 104, and 200 µm for moisture barrier 102. These layers form an encapsulated electronic display; preferably this is bonded, for example by adhesive, to the uppermost transparent display panel. The display panel may have a thickness in the range 0.5-2 mm, for example approximately 1 mm.

As mentioned above, in preferred embodiments the display medium is a reflective display medium, in particular an electrophoretic display medium and the backplane comprises a flexible substrate such as PET or PEN (polyethylene naphthalene). Preferably the backplane is fabricated using solution-based transistors preferably patterned by techniques such as direct-write printing, laser ablation or photolithography. Further details can be found in the applicant's earlier patent applications, including, in particular, WO01/47045, WO2004/070466, WO01/47043, WO 2006/059162, WO2006/056808, WO 2006/061658, WO2006/106365 and PCT/GB2006/050265, all hereby incorporated by reference in their entirety.

Various control and power electronics are contained in the display underneath the non-re-writeable and re-writable display portions. Typically, these electronics include microprocessor, memory (volatile and non-volatile) and associated glue logic, together with a rechargeable power source and associated power management hardware and software.

As discussed above, a non-re-writable display portion borders the re-writable display portion 54. This display border is coloured to substantially match the colour of the re-writable display portion 54, which gives the appearance to the reader of a single display extending to the edges of the reader device. Thus in embodiments a boundary between the active display area and its border (forming margins of a displayed page) is at least partially concealed and may be substantially invisible. The border may comprise a simple border, which may be, for example, sprayed onto the front panel. However in other embodiments to provide a uniform appearance to a user display edging may comprise electrophoretic display material such as an additional, undriven sheet of electrophoretic display or an undriven lateral extension of the re-writable electrophoretic display portion. In preferred embodiments the colour of the holder, at least at the front, substantially matches a background colour of the non-volatile display.

The removable display 50 may also include a number of user controls for selecting documents to view on the display portion 54 and/or pages, turning pages of the electronic documents forward and back and the like. In embodiments, the border around the re-writeable display portion 54 comprises touch sensitive elements. However in other embodiments the display may be touch sensitive, for example as described in our co-pending international patent application PCT/GB2006/050220 hereby incorporated by reference in its entirety. Such sensors may include capacitive sensors or resistive touch sensors. The aforementioned patent application describes an arrangement in which a touch-screen component is positioned below the display, but which is nonetheless operable from the front, display surface, in particular by laminating the display medium and display backplane over a resistive touch-screen (using a pressure sensitive adhesive). However the skilled person will appreciate that other forms of touch-screen technology may additionally or alternatively be employed. In such embodiments, documents may be electronically "marked-up", with mark-up data being written to or being associated with the electronic document being displayed.

In embodiments, the removable display 50 comprises recesses 56a, 56b along its edges. The recesses are shaped to receive the protrusions 20, 22 of the holder 10 for retaining the display in the open front 12 of the holder 10. Additional holes 58 may also be provided around the periphery of the display 50 to securely attach peripherals, such as pens or a stylus for controlling the display, to the edge of the display.

In embodiments, the removable display 50 comprises connectors 62 located along an edge of the device to enable the device to be connected to other electronic devices, such as a laptop or desktop computer, a PDA (Personal Digital Assistant), a mobile phone or 'smart' phone, or other such devices. A USB (universal serial bus) or similar connector is, for example, provided. Such connections enable the transfer of electronic documents and other data between the display and other devices, and for the display to receive power. Alternatively, or additionally, the display may also be provided with wireless interfaces (for example Bluetooth™ or other such interfaces) to enable the transfer of electronic documents between the display and other devices.

In embodiments, the display also comprises an electrical connector 60 to enable connection with the holder 10. The electrical connector 60 is disposed on an edge of the display 50 and comprises a row of electrical contacts, typically 6 to 8, that are shaped and positioned along the edge of the display so as to contact the correspondingly shaped and positioned internal electrical connector 18 located along an inside edge of the open front 12 of the holder 10 when the display is received in the holder. The electrical contacts thereby provide a wired connection between the display 50 and the holder 10. Preferably, the display 50 comprises a second electrical connector (not shown) on an opposing edge of the display so that a connection between the holder and display may be maintained when the display is in either of the forward and storage positions.

Through the electrical connectors 60 and 18, data may pass in either direction between the holder and display, and the holder may provide power to the display.

We shall now describe the electronic document reader system in operation.

Figure 7:
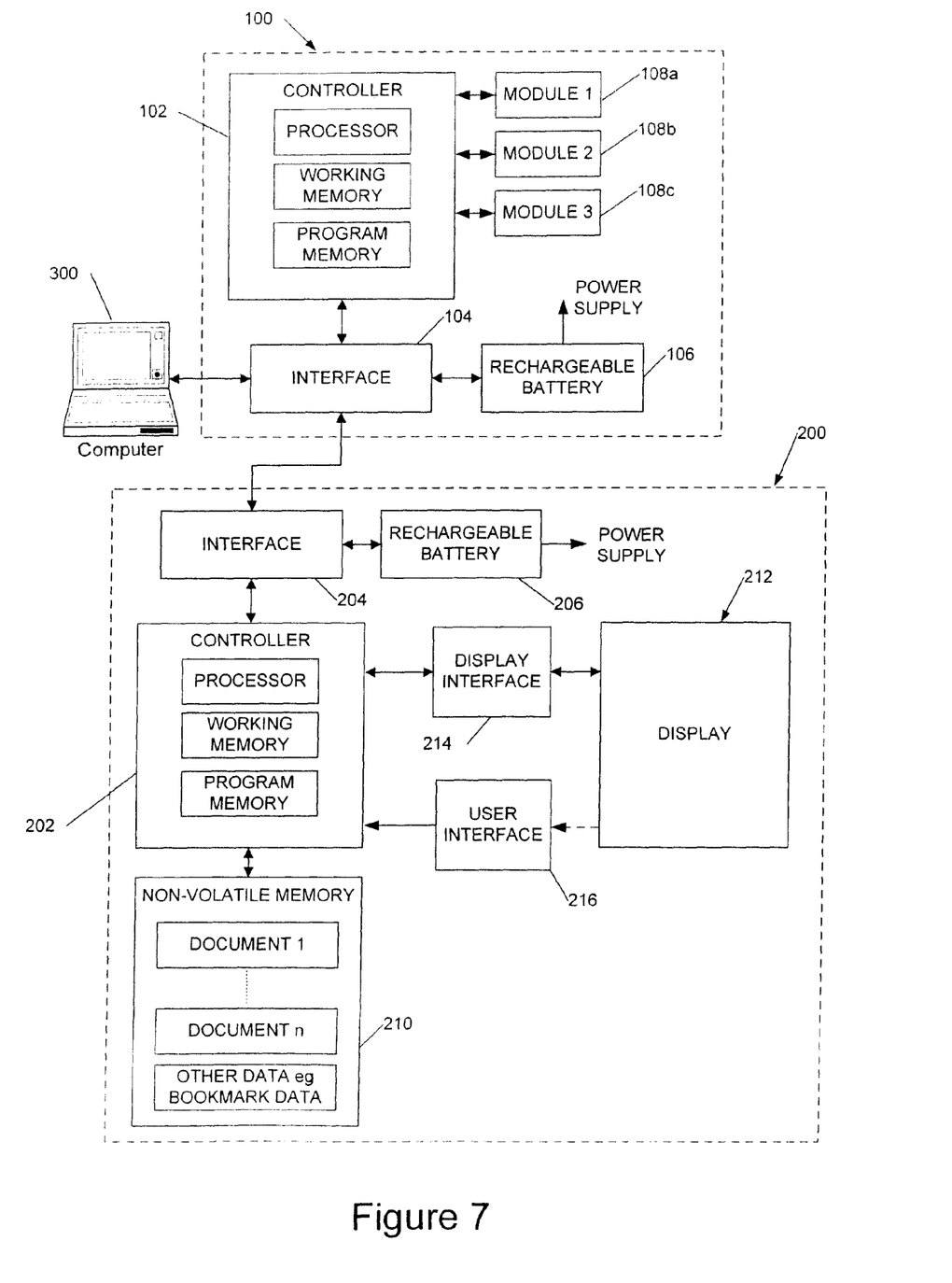
FIG. 7 shows a system block diagram for an electronic document reader system.

FIG. 7 shows the electronic document reader system and example control circuitry suitable for the above-described electronic document reader system 1. The control circuitry of the display 200 comprises a controller 202 including a processor, working memory and programme memory, coupled to a user interface 216 (for example touch sensitive controls). The controller is also coupled to the active matrix driver circuitry of the display 212 by a display interface 214 for example provided by integrated circuits. In this way controller 202 is able to send electronic documents and electronic document data to the display 212 and, optionally, to receive touch-sense data from the display 212. The control electronics also includes non-volatile memory 210, for example Flash memory for storing data for one or more electronic documents for display and, optionally, other data such as user bookmark locations and the like. An interface 204 is provided for interfacing with the holder 100 to receive electronic document data and, optionally, to provide data such as user bookmark data. The interface 204 may comprise a wired (for example through the electrical connectors 60, 18) and/or wireless, for example Bluetooth™, interface. Power is also transferred through the interface 204 to power the display 200 and associated control electronics and/or to recharge a rechargeable battery 206.

The display 200 may instead be connected directly to a computer 300 or other devices via the interface. Again, the interface 204 may comprise a wired (for example a USB connector) and/or wireless, for example Bluetooth™, interface.

The skilled person will appreciate that processor control code for a wide range of functions may be stored in the programme memory. By way of example a simple document display procedure may comprise, in operation, sensing a user control, determining which document to update, reading a portion of the relevant document from the non-volatile memory, and writing the read portion of the document to the page display.

As discussed above, the removable display is useable to view electronic documents whilst in connection with the display holder and/or computer and/or additional peripherals, as well as removed from the holder and/or computer and/or additional peripherals.

The display holder 100 has control circuitry comprising a controller 202 including a processor, working memory and programme memory, coupled to an interface 104 and one or more modules 108. The control electronics also includes non-volatile memory, for example Flash memory for storing data for one or more electronic documents for display on the removable display 200 and additional storage media (not shown) for storing electronic documents and associated data. The interface 104 is provided for interfacing with the display 200 to transmit and receive electronic document data. The interface 104 may comprise a wired (for example through the electrical connectors 60, 18) and/or wireless, for example Bluetooth™, interface. Power is also transferred through the interface 104 to power the display 200 and associated control electronics and/or to recharge a rechargeable battery 106 of the display holder.

Furthermore, the interface 104 provides a connection to external computers (300) and other peripherals, either through wired connectors (for example USB) and/or wireless protocols (for example Bluetooth™, WiFi, 3G and other like protocols) so that electronic documents and their associated data my be transmitted to and received from such connected computers and/or peripherals. The interface 104 also receives power from external sources (such as from a computer connected to the USB wired port or through a dedicated mains connection) to power the display holder electronics and/or recharge the rechargeable batter 106.

Each of the one or more modules 108 are specific to different functional applications of the display holder 100. Different display holders may have different modules. Therefore, different display holders may be targeted at specific markets, or for specific applications. Some examples of modules include: GPS (Global Positioning System), additional storage media, an Internet connection browser, a keyboard or other physical user interface-based document editor/processor, an expansion card/device module, a module for formatting a document for viewing on the removable display, or additional graphical or general processors, and modules for other specific application programs residing in the memory of the holder. Each of the modules has associated with them software and/or hardware to perform the desired function.

Thus, it can be seen that, by connecting the removable display to the display holder (via any of the wired or wireless connectors), the display holder provides the display with an additional power source, processing power and/or functionality (via the one or more modules).

An example of the electronic document reading system in use will now be described. In this example, a user requires access to electronic documents whilst travelling on business.

Initially, the user places the removable display 200 within the holder, thus enabling the internal connectors to make a connection between the holder and display. The holder provides at least power to the display to recharge the display's rechargeable battery. Connecting a computer 300 to the holder enables the transfer of electronic documents stored on the computer to the memory of the holder and display. The user may designate the electronic documents to transfer to the holder and display via a graphical user interface on the computer or the display itself. Alternatively, the process may be automated, and all of the electronic documents present on the computer that are not present on the holder and/or display are transferred to the holder and/or display. In such a method, the electronic documents on the computer, holder and display are synchronised.

Once the electronic documents are transferred or synchronised, the user detaches the holder from the computer and/or power source. The user may transport the display in the holder in either of the forward or storage positions (as discussed above). Should the user not require access to the electronic documents, the user stores the display in the storage position to protect the display area of the screen from damage or scratches that might occur during transit. In the storage position, power is provided to the display's rechargeable battery by the holder's rechargeable power source.

Whilst connected to the holder and with the display in the forward position, the user may use the display to view the electronic document. From the graphical user interface of the display and the touch sensors on the display surface, the user may control the viewing of the electronic documents (and record user annotations of the electronic documents should touch sensors be provided over the re-writeable portion of the display). Since the display is connected to the holder, the user may also control or use other peripherals connected to the holder, and may also use any applications specific to that holder (for example GPS, WiFi, 3G).

Should the user not require the holder, or would prefer not to carry around additional weight, the display may be released from the holder (as described above). Whilst released and removed from the holder, the user may use the display as before i.e. the user may use the graphical user interface of the display and the touch sensors (or keyboard such as a touch keyboard) on the display surface to control the viewing of the electronic documents (and record user annotations of the electronic documents should touch sensors be provided over the re-writeable portion of the display).

The user may also connect to various peripherals such as external projectors, a mouse, printers and the like using the wired or wireless interfaces.

Once the user has finished using the display, the display is placed back into and connected to the holder. Once connected to the holder, power is again received from the holder to recharge the display's rechargeable battery. Furthermore, any annotations or changes made to the electronic documents whilst the display was removed away from the holder are synchronised with the copy of the electronic documents stored in the memory of the holder.

After the business trip, the user returns and connected and the display and holder to the computer. Power is again received from the computer and/or external power source to recharge the holder and display's rechargeable battery. As with the display and holder, any annotations or changes made to the electronic documents whilst the display and/or holder were remote from the computer are synchronised with the copy of the electronic documents stored in the computer.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. An electronic document reader system for viewing electronic documents, comprising:
   a removable non-volatile display for viewing electronic documents thereon, the display having a display portion on which electronic documents are viewable;
   a portable display holder for receiving the removable display, the display holder comprising a back, and an open front shaped to receive the removable display, each of the display and the holder having an electrical interface,
   wherein, when the removable display is received in the open front, the removable display and holder form an electrically connected combined unit to enable the display to receive document data from the holder for display,
   and wherein the removable display is useable to read electronic documents when removed from the display holder, wherein:
   said open front of said display holder comprises a recess in a front surface of the display holder, said recess having an aperture to receive said display, said recess being sized to just contain said removable display;
   the display holder comprises retaining means to releasably retain the received removable display flush in the display holder so as to give the removable display and display holder a generally laminar shape;
   the removable display is receivable in the display holder recess in a forward position in which the removable display is readable by a user through said aperture when the display is received in the display holder; and
   the open front of the display holder has a bottom surface and wherein the removable display is receivable in the display holder in a storage position in which the display portion of the removable display faces towards the bottom surface so as to protect the display portion and the back of the display portion is substantially flush with the surrounding front part of the holder;
   wherein the system has a thickness of less than 10 mm.

2. A system according to claim 1, wherein the retaining means further comprises one or more protrusions along a first inside edge of the open front of the display holder and one or more spring-loaded protrusions along a second inside edge of the open front of the display holder opposing the first inside edge, the protrusions along at least one of the first and second inside edges being shaped so as to engage with a correspondingly shaped recess in respective edges of the removable display.

3. A system according to claim 2, wherein the display holder further comprises a display releasing means to release the removable display from the display holder, the display releasing means comprising a flap on the one or more spring-loaded protrusions positioned in a base of the open front so as to sit under the removable display when the display is received in the holder, and the flaps being operable to push the removable display from the display holder.

4. A system according to claim 1, wherein, when the removable display is received in the open front, the display holder protects and/or mechanically supports the removable display.

5. A system according to claim 1, wherein the display holder substantially matches the removable display so as to give the appearance that the display holder is an extension of the removable display when the display is received in the open front.

6. A system according to claim 1, wherein, when the removable display is received in the open front of the display holder, the display is connected to the display holder to receive power.

7. A system according to claim 1, wherein the display holder comprises an electrical connector along a portion of an inside edge of the open front, the electrical connector comprising a row of electrical contacts shaped and positioned along the inside edge so as to contact a correspondingly shaped and positioned electrical connector in an edge of the removable display when the display is received in the display holder.

8. A system according to claim 1, wherein the display holder further comprises an external electrical connector for connection to one or more of external peripherals and/or external power sources.

9. A system according to claim 1, wherein the display holder further comprises a wireless interface to transmit data to and/or receive data from external peripherals.

10. A system according to claim 9, wherein the wireless interface comprises one or more of Bluetooth, 3G and Wifi.

11. A system according to claim 1, wherein the external peripherals, when connected to the display holder, are accessible by the removable display when the display is in connection with the display holder.

12. A system according to claim 1, wherein the display holder contains a CPU, memory storage and application software that generates documents for display on the removable display.

13. A system according to claim 1, wherein each of the removable display and display holder are portable and have a separate rechargeable power source.

14. A system according to claim 13, wherein the rechargeable power source of the display holder provides power to the display and/or recharges the rechargeable power source of the removable display when the display is received within the display holder.

15. A system according to claim 1, wherein the display portion of the removable display comprises an electroactive display.

16. A system according to claim 15, wherein the electroactive display comprises an electrophoretic display.

17. A system according to claim 1, wherein the removable display comprises one or more touch sensitive regions in one or more regions of the display portion.

18. A system according to claim 1, wherein the removable display comprises a wireless interface for transmitting data to and/or receiving data from the display holder and/or one or more external peripherals.

19. A system according to claim 18, wherein the wireless interface comprises Bluetooth.

20. A system according to claim 1, wherein the display comprises an electrical connector along an edge of the display, the connector comprising a row of contacts shaped and positioned so as to contact a correspondingly shaped and positioned electrical connector on an inside edge of the open face of the display holder when the display is received in the display holder.

21. A system according to claim 1, wherein the removable display comprises a recess along one or more edges of the display for receiving a correspondingly shaped protrusion of the display holder for retaining the display in the display holder.

22. A method of providing a portable electronic document, the method comprising:
- using an electronic document reader system according to claim 1, said use comprising using a removable electro-active non-volatile display for displaying electronic documents in said electronic document reader system, the display comprising a memory store for storing electronic documents;
- writing one or more electronic documents to the memory store of the display;
- removing the removable display from the electronic document reader system; and
- using the removable display to display the electronic documents remote from the electronic document reader system;
- wherein the system has a thickness of less than 10 mm.

23. An electronic document reader system according to claim 1 for viewing electronic documents, comprising:
- a removable non-volatile display for viewing electronic documents thereon, the display having a display portion on which electronic documents are viewable;
- a portable display holder for receiving the removable display, the display holder comprising a back, and an open front shaped to receive the removable display;
- wherein, when the removable display is received in the open front, the removable display and holder form a flush, combined unit so as to give the removable display and display holder a generally laminar shape,
- and wherein the removable display is useable to read electronic documents when removed from the display holder.

24. An electronic document reader system according to claim 1 for viewing electronic documents, comprising:
- a removable non-volatile display for viewing electronic documents thereon, the display having a display portion on which electronic documents are viewable;
- a portable display holder for receiving the removable display, the display holder comprising a back, and an open front shaped to receive the removable display;
- wherein, when the removable display is received in the open front, the display holder protects and/or mechanically supports the removable display,
- and wherein said removable display is able to receive electronic documents from the display holder; and
- wherein the removable display is useable to read electronic documents when removed from the display holder.

25. An electronic document reader system according to claim 1 for viewing electronic documents, comprising:
- a removable non-volatile display for viewing electronic documents thereon, the display having a display portion on which electronic documents are viewable;
- a portable display holder for receiving the removable display, the display holder comprising a back, and an open front shaped to receive the removable display;
- wherein the display holder substantially matches the removable display so as to give the appearance that the display holder is an extension of the removable display when the display is received in the open front,
- and wherein the removable display is useable to read electronic documents when removed from the display holder.

26. An electronic document reader system according to claim 1 for viewing electronic documents, comprising:
- a removable non-volatile display for viewing electronic documents thereon, the display having a display portion on which electronic documents are viewable;
- a display holder for receiving the removable display, the display holder containing a CPU, memory storage and application software, and the display holder comprising a back, and an open front shaped to receive the removable display, each of the display and the holder having an electrical interface,
- wherein, when the removable display is received in the open front, the removable display and holder form an electrically connected combined unit to enable the display to receive document data from the holder for display,
- wherein the application software generates documents for display on the removable display,
- and wherein the removable display is useable to read electronic documents when removed from the display holder.

* * * * *